United States Patent [19]

Barnett, II et al.

[11] 4,068,464
[45] Jan. 17, 1978

[54] SHOCK RESISTANT WRISTWATCH MODULE

[75] Inventors: James V. Barnett, II, Cupertino; Ernest F. Mayer, Palo Alto; James W. Pfeiffer, Santa Clara; Larry D. Wickwar, San Mateo, all of Calif.

[73] Assignee: Fairchild Camera and Instrument Corporation, Mountain View, Calif.

[21] Appl. No.: 658,219

[22] Filed: Feb. 17, 1976

[51] Int. Cl.² .............................................. G04B 19/30
[52] U.S. Cl. ................................. 58/50 R; 58/23 R; 58/23 BA
[58] Field of Search ................ 58/23 R, 50 R, 23 BA; 174/68.5, 52 R; 317/101 A, 101 B, 101 C, 101 CC, 120

[56] References Cited

U.S. PATENT DOCUMENTS

| | | |
|---|---|---|
| 3,650,599 | 3/1972 | Pedersen .......................... 58/50 R X |
| 3,759,031 | 9/1973 | McCullough et al. .............. 58/50 R |
| 3,784,725 | 1/1974 | Perkins et al. .................... 58/50 R X |
| 3,838,568 | 10/1974 | Zurcher et al. .................. 58/23 R X |
| 3,846,972 | 11/1974 | Doss ................................ 58/50 R X |
| 3,965,665 | 6/1976 | Somogyi .......................... 58/23 BA |
| 4,009,564 | 3/1977 | Zurcher .......................... 58/50 R X |

*Primary Examiner*—Ulysses Weldon
*Attorney, Agent, or Firm*—Alan M. MacPherson; Henry K. Woodward; Norman E. Reitz

[57] ABSTRACT

A new and improved shock-resistant electronic watch module is provided, which comprises a case, a frame of electrically insulating material mounted in the case, a lens plate of an electrically insulating material being flexibly mounted on a first side of the frame, a substrate mounted to the lens plate, a frequency standard, a frequency divider, an electro-optical display means, and means for driving the display, all being mounted to the substrate, and, a battery removably mounted on a second side of the frame and being electrically coupled to the substrate.

9 Claims, 21 Drawing Figures

Fig_1

Fig_2

Fig_3b

Fig_3e

Fig_4a

Fig_4b

Fig_7a

Fig_7b

Fig_7c

Fig_8a

Fig_8b

SHOCK RESISTANT WRISTWATCH MODULE

BACKGROUND OF THE INVENTION

1. Field of the Invention

This invention generally relates to wristwatches, and in particular to a shock-resistant electronic wristwatch.

2. Prior Art

The more recently developed electronic watches, and those employing a digital display in particular, employ fragile components which are susceptible to damage from a mechanical shock. The integrated semiconductor chip or chips, which contain the time counting circuits, are themselves rugged and will withstand substantial shocks normally encountered. However, the complementary components of the digital watch module are more fragile. It is general practice in the digital watch art to mount the semiconductor chip or chips on a substrate, or disk-like printed circuit board, and to also mount the electro-optical display means on this same substrate. The substrate is usually mounted in a frame, which also supports a battery or batteries. Some prior art devices abut the batteries directly against the substrate, as shown in U.S. Pat. No. 3,838,568, which issued Oct. 1, 1974 to Zurcher, et al.

In such a prior art device, the batteries will crack the substrate or dislodge components mounted thereon when a substantial shock occurs such as, for example, dropping the watch. The mass of the batteries is substantially large in comparison to the other components in the watch, and thus have a large inertia. Therefore, dropping such a watch will create large mechanical momentum of the batteries, which can damage the watch module.

Another prior art device mechanically isolates the batteries from the substrate, and provides an independent electrical connection of the battery terminals to the substrate. An example of this prior art device is disclosed in U.S. Pat. No. 3,759,031, which issued Sept. 18, 1973 to McCullough, et al. This device overcomes some of the problems of the first-cited device in that the batteries are prevented from impacting directly against the substrate. However, this device does not completely overcome the problem of mechanically isolating the substrate from shock waves of the batteries created by, for example, dropping the watch.

SUMMARY OF THE INVENTION

In accordance with the present invention, a new and improved shock-resistant electronic watch module is provided, which comprises a case, a frame of electrically insulating material mounted in the case, a lens plate of an electrically insulating material being flexibly mounted on a first side of the frame, a substrate mounted to the lens plate, a frequency standard, a frequency divider, an electro-optical display means, and means for driving the display, all being mounted to the substrate, and, a battery removably mounted on a second side of the frame and being electrically coupled to the substrate.

An advantage of the present invention is that the watch module is easily assembled while maintaining an accurate alignment reference between the constituent components of the watch. Another related advantage is that the substrate containing the electrical components of the watch may easily be changed in design without a major redesign of the watch module.

Other advantages of the present invention include means for providing resistance to moisture as well as shock; means for easily replacing a battery or batteries; electrical contact means between the battery and the electrical circuit which cleans any undesirable residual oxides which may build up on the battery terminal or electrical circuit contact of the substrate.

The watch module of the present invention basically comprises two separate subassemblies, which may be readily tested individually prior to final manufacture assembly. The lens plate and substrate subassembly is flexibly mounted to the module frame subassembly to provide the shock resistance feature of the watch module.

DETAILED DESCRIPTION

Like reference numerals are employed in the following description of the drawings to represent the same part or parts illustrated and described.

Figure 1:
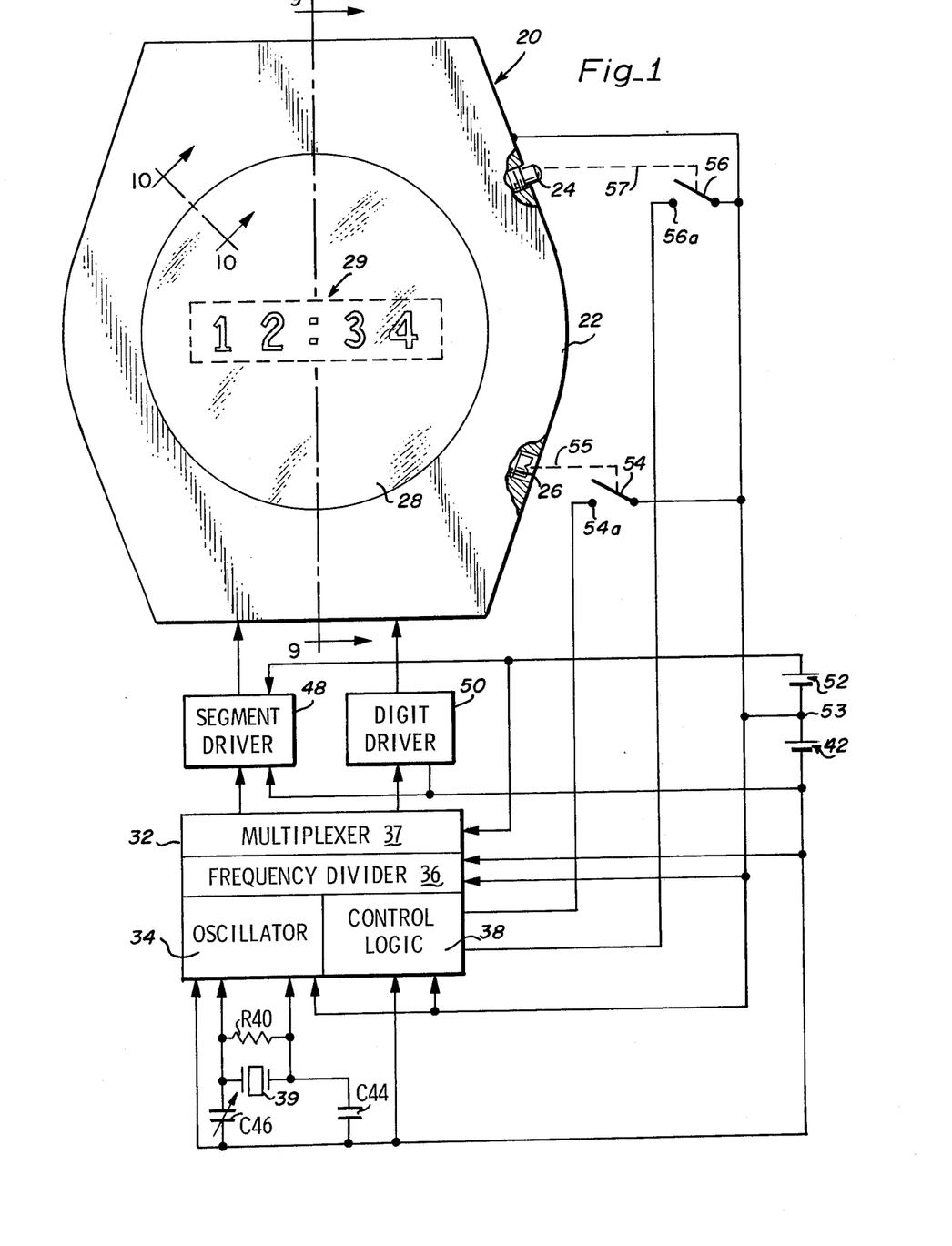
FIG. 1 is a block diagram of the wristwatch module of the present invention, including a plan view of the wristwatch case.

Referring now to the drawings, and in particular to FIG. 1, a block diagram of a digital wristwatch 20 employing the shock-resistant module of the present invention is illustrated, which includes a plan view of a watch case 22. The wristwatch 20 includes a time display command switch button 24, and a set or reset switch button 26, which are both illustrated in partially cutaway portions of the case 22. A display window 28 covers an electro-optical display means 29, which window is typically formed from a transparent red plastic or ruby material.

An integrated circuit chip 32 is provided, as the time generating means, which contains an oscillator circuit 34, a frequency divider circuit 36 and a control logic circuit 38. The oscillator circuit generates an oscillatory signal of typically 32,768 Hz, and the frequency divider circuit 36 steps this frequency down to that representative of seconds, minutes, hours, month and day. The multiplexer 37 translates the output of the frequency divider for the display means 29. The control logic circuit 38 functions to control the operation of the frequency divider and multiplexer 37 in response to activation of switch bottons 24 and 26.

In particular, the oscillator circuit 34 includes components external to the integrated circuit chip to provide the necessary oscillatory signal. That is, a frequency standard crystal 39 is coupled across two terminals of the oscillator circuit 34 to establish a fixed frequency of oscillation. A resistor R40 is coupled across the crystal 39. A fixed capacitor C44 of approximately 30 picofarads, and a variable capacitor C46 of approximately 5 to 30 picofarads are coupled between respective terminals of crystal 39 and the negative terminal of a battery cell 42. The battery cell 42 typically provides 1.5 volts.

The negative terminal of cell 42 is also coupled to negative voltage supply input terminals of the oscillator circuit 34, the frequency divider circuit 36, and the control logic circuit 38. In addition, the negative voltage terminal of cell 42 is provided at voltage supply inputs of a segment driver 48 and a digit driver 50. These latter two driver circuits have inputs coupled to outputs of the multiplexer 37, and outputs coupled to the electro optical display means 29.

The positive terminal of the cell 42 is coupled to the negative terminal of a second battery cell 52 at a circuit terminal point 53, which cell also typically supplies 1.5 volts. The positive terminal of cell 52 is coupled to voltage supply input terminals of the multiplexer 37, and the segment driver 48, thereby providing 3.0 volts across these circuits. The terminal 53 between the cells 42 and 52 is coupled to other voltage supply input terminals of the oscillator circuit 34, the control logic 38, and the frequency divider 36, thereby providing 1.5 volts across these circuits.

The terminal 53 is also coupled to the operating terminals of a pair of switches 54 and 56, and to the case 22. The operating terminals of switches 54 and 56 are activated by the switch buttons 26 and 24, respectively, as indicated in FIG. 1 by the dashed lines 55 and 57, respectively. The normally open terminals 54a and 56a of switches 54 and 56, respectively, are coupled to the control logic circuit 38 to complete current paths for these switches.

A single depression of switch button 24 closes the switch 56, which causes the multiplexer 37 to drive the display means 29 threrby dislaying the frequency divider status of hours and minutes for approximately 1 to 1.5 seconds in a form, similar to that shown on the face of the watch 20. The display operation is effected by providing a current path to the electro-optical display means 29 through the segment driver 48 and the display means, and back to the negative terminal of cell 42 by means of the digit driver 50. For example, in a typical watch circuit design, if the switch button 24 is depressed twice in rapid succession, the control logic circuit 38 causes the multiplexer circuit 37 to multiplex a display of the current month and date. If the button 24 is depressed three times in rapid succession the control logic circuit 38 causes a display of the seconds. The button 26 is used in conjunction with the button 24 to set the frequency divider circuit to the correct month, day, hour and minute.

Figure 2:
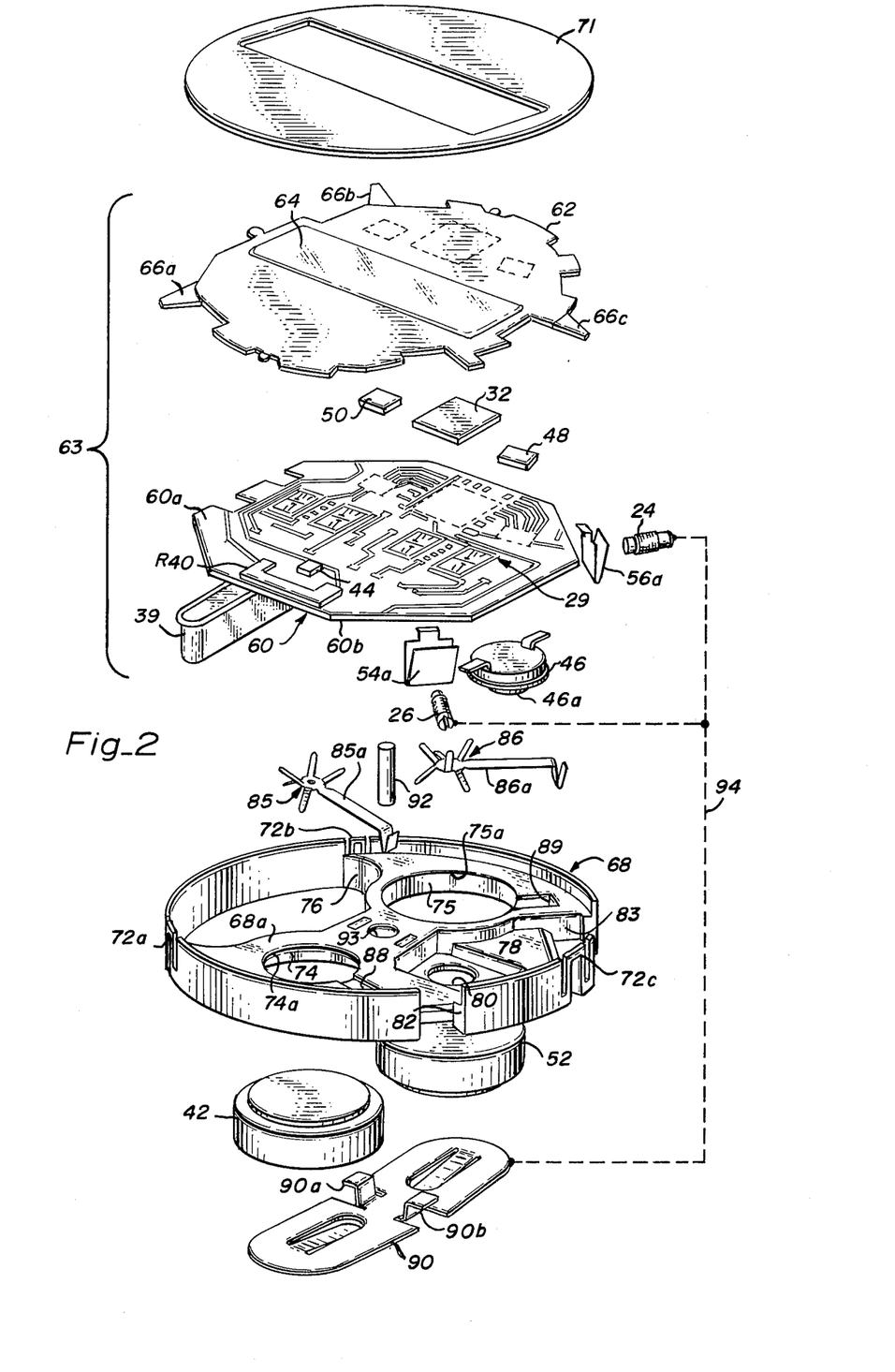
FIG. 2 is an exploded view of the wristwatch module of the present invention, showing the arrangement of the component parts thereof.

Referring now to FIG. 2, an exploded view of the watch module of the present invention is illustrated. A substrate 60 is disposed for providing a support for the electro-optical display 29, the integrated circuit chip 32, the segment driver 48, the digit driver 50, the resistor R40, and the capacitor C44. In addition, circuit traces of a conductive material are formed in a conventional manner on the top and bottom surfaces 60a and 60b of the substrate 60 to provide electrical interconnections between the constituent components of the watch circuit. The variable capacitor C46 is located on the bottom surface 60b of substrate 60 and has an adjustment screw 46a disposed for varying the capacitance thereof. The normally open contacts 54a and 56a are soldered to circuit traces on the top surface 60a of substrate 60 in appropriate electrical connection with the circuit shown in FIG. 1. The contacts 54a and 56a are preferrably made of an electrically conductive material sufficiently resilient to withstand frequent deformations from the switch buttons 26 and 24, respectively.

The crystal 39 is rigidly mounted to the bottom side 60b of the substrate 60 with electrical connections being made with appropriate circuit traces. This rigid mount of the crystal to the substrate, as will be explained in greater detail hereinbelow, comprises a significant part of the shock resistance feature of the present invention.

A lens plate 62 is located over the substrate 60 with a window 64 aligned over the electro-optical display means 29. The lens plate 62 has recessed areas, which will be shown and described further hereinbelow, that align with the components on the surface 60a of substrate 60. Thus, the lens plate 62 contacts the surface 60a of the substrate 60, and is affixed thereto with a suitable epoxy composition, which provides moisture resistance to the circuit components on the substrate surface 60a.

Accordingly, the lens plate 62 and the substrate 60 containing the above-described components form one integral assembly unit 63 of the watch module. The crystal 39 and the variable capacitor C46 also form a part of the assembly 63.

The lens plate 62 is preferably formed from a flexible plastic material such as a nylon base thermoplastic of which trogamide is an example. Tabs 66a, 66b and 66c extend from the periphery of the lens plate 62 at approximately 120 degrees apart to provide a means for suspending the assembly 63 in a module frame 68. A mask 71 of opaque material is affixed to the top surface of the lens plate 62 to reduce background light reflection and to reduce extraneous light interference with the electro-optical display.

The assembly 63 is suspended in the frame 68 by means of retainers 72a, 72b, and 72c disposed about the perimeter of frame 68 and in alignment with the tabs 66a, 66b and 66c, respectively. The retainers 72a, 72b and 72c are preferrably but not necessarily flexible with respect to the frame 68 to afford ease of manufacture of the watch module.

At this juncture of the description it is pointed out that the assembly 63 is free to move a limited amount in the frame 68 to dampen out shock waves upon impact of the watch module. By rigidly mounting the crystal 39 to the substrate 60, which is rigidly mounted to the lens plate 62, the shock waves of the assembly 63 are translated to the frame 68 by means of the suspension tabs 66a, 66b and 66c. The mechanical energy of these shock waves are absorbed by the tabs 66a, 66b and 66c.

The frame 68 has openings 74 and 75 to receive the battery cells 42 and 52, respectively. Openings 74 and 75 are the same diameter as the cells 42 and 52; however, the diameter of these openings is reduced near the top surface 68a of frame 68. Thus, flanges 74a and 75a are provided over the openings 74 and 75 such that the batteries cells are retained away from the substrate 60 to avoid any mechanical contact with the substrate. The reduced diameter portions of openings 74 and 75 allow electrical contact to be made between the batteries and the substrate, which will be explained in greater detail hereinbelow.

Frame 68 has another opening 76 to receive the crystal 39, and a recessed area 78 to receive the variable capacitor C46. An opening 80 is provided in recessed area 78 to provide accessability to the adjustment screw 46a of the capacitor C46. Two additional openings 82 and 83 are provided in frame 68 to receive the contacts 54a and 56a, respectively. The design of frame 68 can readily be changed if desired to relocate openings 82 and 83 to relocate the switches 54 and 56 (and buttons 26 and 24, respectively). Also, additional openings may be provided to accommodate additional switches if desired. The openings 82 and 83 for contacts 54a and 56a allow suitable clearance for these contacts such that the contacts do not provide any support for the substrate assembly 63. Thus, contacts 54a and 56a are totally independent of the suspension tabs 66a, 66b and 66c.

Spring battery contacts 85 and 86 are disposed between the bottom surface 60b of the substrate 60 and top surface 68a of frame 68. The contacts 85 and 86 are anchored in the frame 68 in recessed areas 88 and 89, respectively. The recessed areas 88 and 89 extend to the periphery of flange openings 74a and 75a to receive the extension arms 85a and 86a of contacts 85 and 86 when the substrate 60 in its normal position of being flat against the surface 68a of the frame 68. The battery contacts 85 and 86 are made of an electrically conductive material sufficiently resilient to retain their shape after frequent compressions thereof. Thus, contacts 85 and 86 provide electrical connections between the battery terminals and the circuit traces on the bottom surface 60b of the substrate 60. By forming the contacts 85 and 86 with a plurality of extension fingers as shown in FIG. 2, the electrical connection contacts with the battery terminals and the circuit traces (not shown) on surface 60b of the substrate are cleaned of any oxides that may form thereon by movements of the assembly 63 within the frame 68. Thus, the electrical connections between the battery terminals and the substrate circuitry are refreshed by vibrations of the watch module.

The batteries 42 and 52 are supported in the frame 68 by means of a battery retainer 90, which is made of an electrically conductive material sufficiently resilient to retain its shape after compression thereof. Tabs 90a and 90b of the retainer 90 engage flexible clips (not shown in FIG. 2) disposed on the bottom surface 68b of the frame 68, to secure the retainer 90 against the frame, thereby holding the batteries in place. The batteries are retained at the top thereof by the flanges 74a and 75a. An electrical conductor 92 is located in another opening 93 in the center of frame 68, which makes an electrical connection between the retainer 90 and a circuit trace on the bottom surface 60b of the substrate 60. The conductor 92 is preferably made from a resiliant electrical conductive material, such as an electrically conductive plastic or a metallic spring, and interference lock in opening 93 without other support therein. The electrical connection formed by the conductor 92 corresponding to the common connection between batteries 42 and 52 (at terminal 53, FIG. 1).

The switch buttons 24 and 26 are shown in FIG. 2 in close proximity to contacts 56a and 54a. An electrical connection is made between the retainer 90 (corresponding to terminal 53, FIG. 1) and the switch buttons 24 and 26 by means of the wristwatch case 22, assuming of course that the case is made from an electrically conductive material. This electrical connection is shown in FIG. 2 by means of dashed line 94. If, however, the watch case 22 is made of a plastic material or the like, which is not electrically conductive, then this electrical connection is made by other means such as changing the contacts 54a and 56a to serve as both sides of the switches 54 and 56, and using bottons 34 and 26 to provide connection between the sides.

Figure 3A:
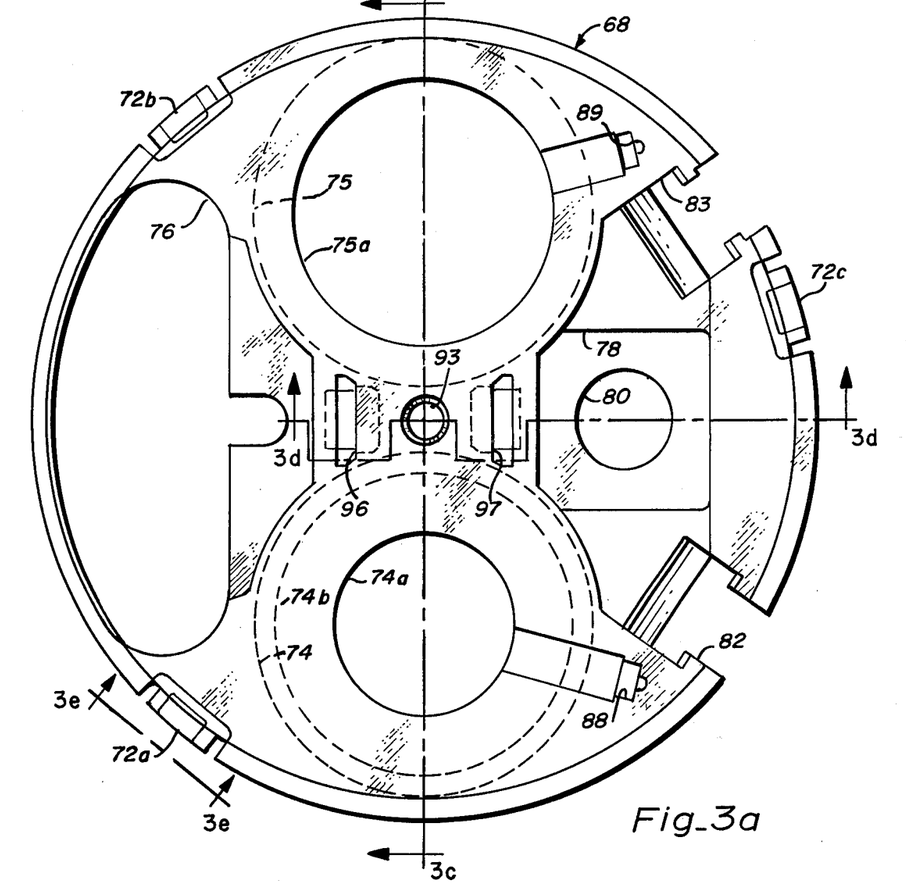
FIG. 3a is a top plan view of the frame of the wristwatch module.
Figure 3B:
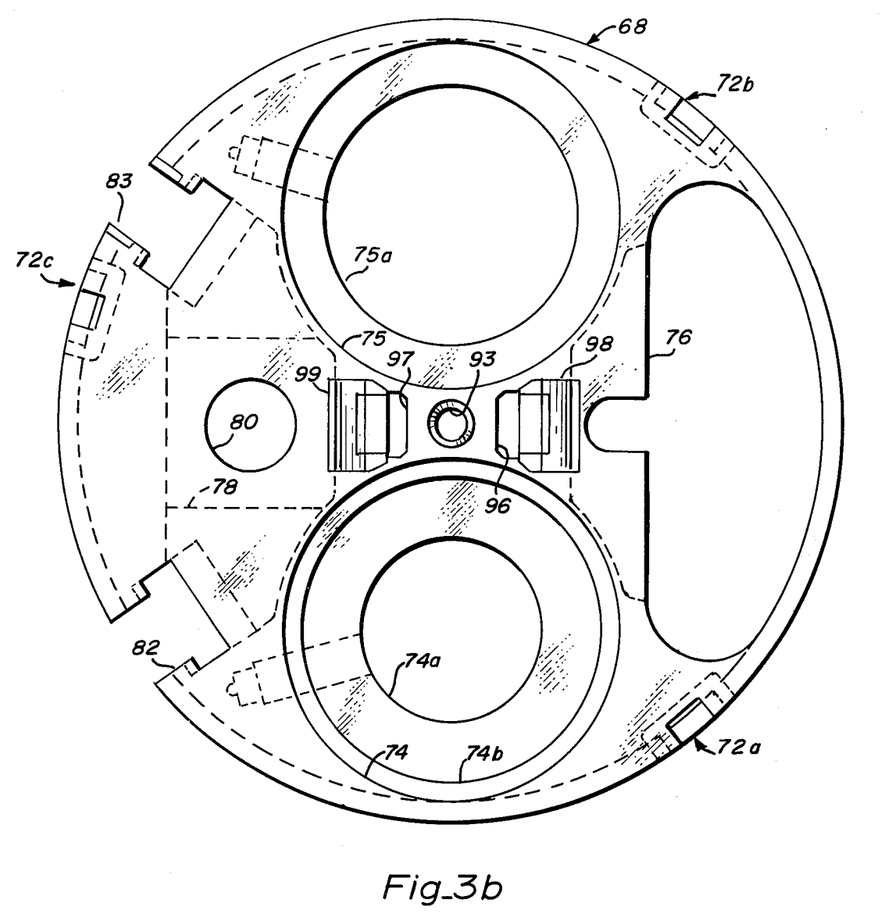
FIG. 3b is a bottom view of the frame of the wristwatch module.

Referring now to FIG. 3a, a top plan view of the frame 68 of the watch module is illustrated, which figure shown the above described openings in the frame 68 in greater detail. Two additional openings 96 and 97 are illustrated on either side of the center opening 93, which form a part of the clips that engage the tabs of the battery retainer 90. The bottom view of frame 68 (FIG. 3b) shows these clips 98 and 99 adjacent to the openings 96 and 97, respectively.

Figure 3C:
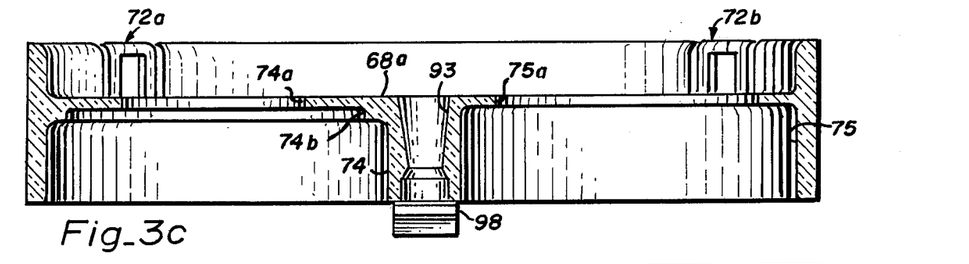
FIGS. 3c, d and e are cross-sectional views of the frame taken along lines 3c, 3d and 3e, respectively.

The cross-sectional view of FIG. 3c shows the battery openings 74 and 75, and the flanges 74a and 75a in greater detail. Note that battery opening 74 has a smaller diameter groove 74b between the opening 74 and the flange 74a. This groove is designed to receive a battery cell in only one orientation. That is, small battery cells typically used in electronic watches have a flat side for the positive terminal and a stepped side for the negative terminal. Thus, the stepped side of a battery cell engages the groove 74b, whereas the flat side of the battery cell will not. Accordingly, the groove 74b assures that the battery cell is placed in the frame opening 74 with the proper terminal orientation. Furthermore, by providing this added groove, if the battery is put in the frame improperly, the spring contacts 85 and 86 will make electrical connection with the substrate.

Figure 3D:
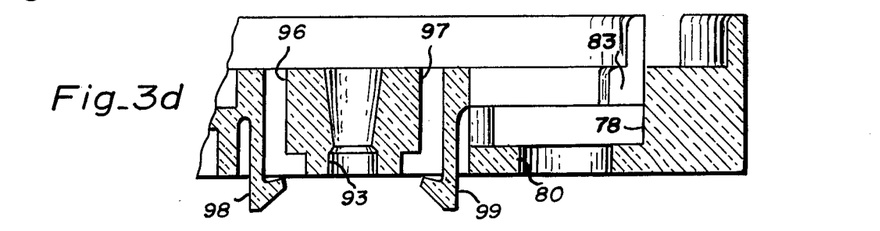

The cross sectional view shown in FIG. 3d illustrates the clips 96 and 97 more clearly. These clips are flexible to allow insertion of the battery retainer tabs 90a and 90b between the clips 96 and 97.

Figure 3E:
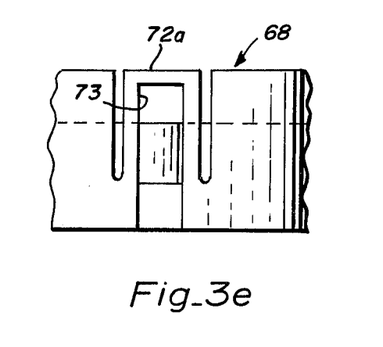

FIG. 3e illustrates an elevational view of the tab retainer 72a on the periphery of the frame 68. An opening 73 is formed in the retainer 72a to receive the tab 66a of the lens plate 62.

Figure 4A:
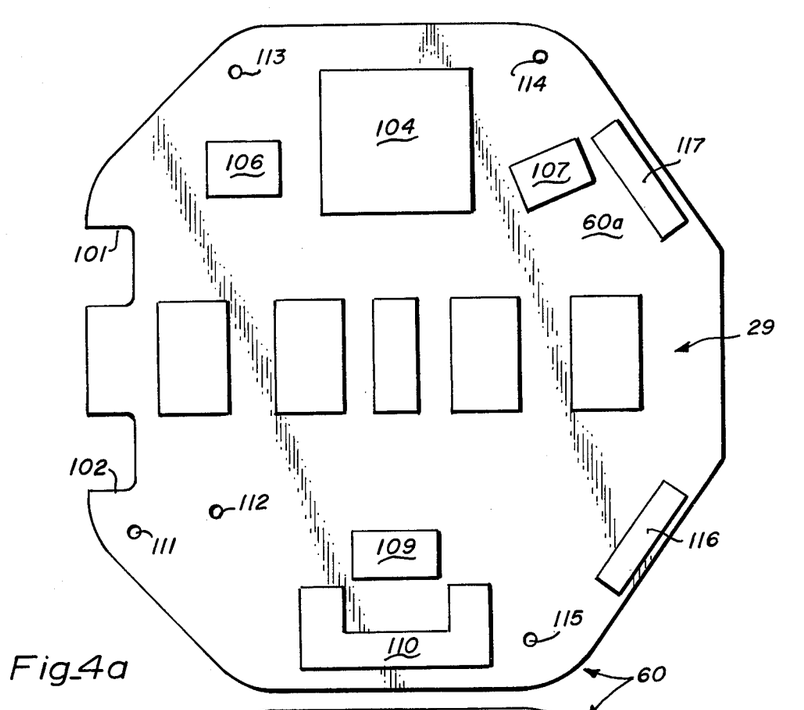
FIGS 4a and 4b are top and bottom views of the substrate.
Figure 4B:
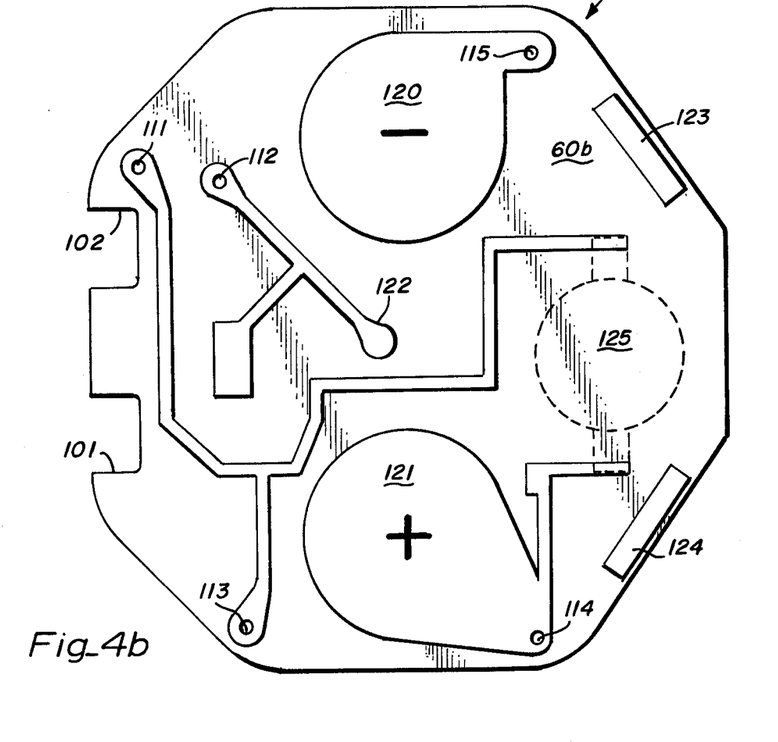

FIGS. 4a and 4b illustrate the top surface 60a and bottom surface 60b, respectively, of the substrate 60. The locations of the circuit components are illustrated, which components are interconnected by a multi-layer metallization pattern (not shown) in accordance with the block diagram shown in FIG. 1. Openings 101 and 102 in the periphery of the substrate are formed to receive electrical leads from the crystal 39.

On surface 60a (FIG. 4a) the electro-optical display means 29 is located horizontally (when the drawing is viewed in a conventional manner) along a diameter of the substrate 60. This orientation is easily accomplished during assembly of the watch module since suspension tabs 66a, 66b and 66c are disposed for alignment with the retainers 72a, 72b and 72c of the frame 68 in only one position of the lens plate assembly 63. The integrated circuit chip is located in an area designated 104, and the segment and digit drivers are located in areas disignated 106 and 107, respectively. The fixed capacitor C44 is located in an area designated 109, and the resistor R40 is formed in an area designated 110. However, these components could be designed into the chip if desired.

Openings 111 through 115 are formed in the substrate 60 to provide electrical connections between the circuit traces on surface 60a with those circuit traces on surface 60b. Circuit traces 116 and 117 are disposed for soldering the contacts 54a and 56a, respectively. In FIG. 4b, the negative terminal of the cell 42 is coupled to circuit trace 120, and this trace is connected to other circuit traces on surface 60a by means of opening 115. The positive terminal of cell 52 is coupled to circuit trace 121, and this trace is connected to other circuit traces on surface 60a by means of opening 114. Contact 92 (FIG. 2) engages surface 60b on circuit trace 122, which comprises the common connection between cells 42 and 52 at circuit terminal 53 (FIG. 1). Circuit trace 122 is coupled to other traces on surface 60a by means of opening 112. Circuit traces 123 and 124 are located on surface 60b of substrate 60 opposite traces 116 and 117, respectively, on surface 60a for soldering the switch contacts 54a and 54b.

The variable capacitor C46 is located in an area designated 125, and terminal tabs C46 are soldered to the circuit trace 121 and a circuit trace 126. The trace 126 is connected to other circuit traces on surface 60a by means of openings 111 and 113.

Figure 5A:
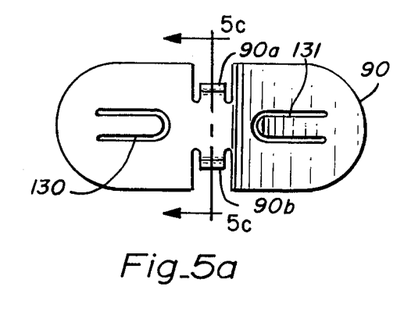
FIGS. 5a, 5b and 5c are top, elevational and cross-sectional views, respectively of the battery retainer.
Figure 5B:
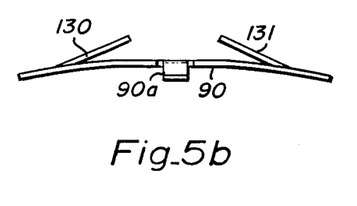
Figure 5C:
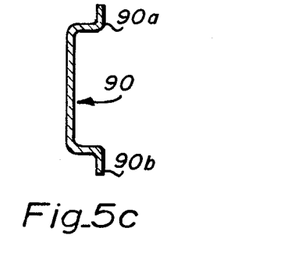

FIGS. 5a, 5b and 5c illustrate the plan, elevational and cross-sectional views, respectively, of the battery retainer 90. Tabs 90a and 90b are formed on either side of the retainer 90 to provide a means for engaging clips 98 and 99 (FIG. 3d). The retainer 90 is preferably made from an electrically conductive material sufficiently resiliant to retain its shape after compression thereof. A pair of prongs 130 and 131 are cropped out of the retainer 90 to provide an electrical connection with the inside of the back cover of the case 22.

Figure 6A:
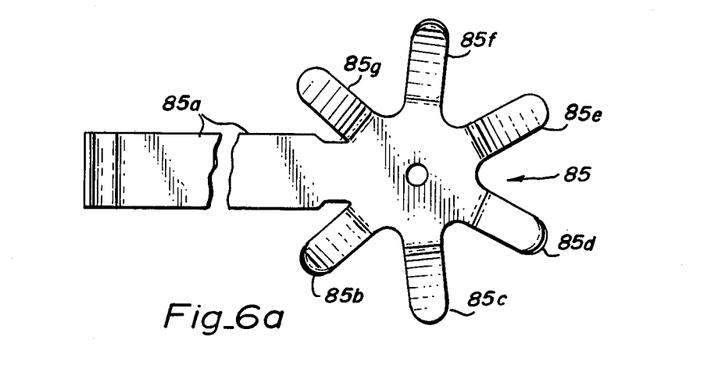
FIGS. 6a and 6b are top and elevational views of the spring battery contact.
Figure 6B:
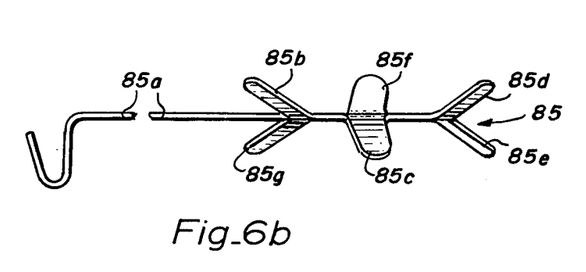

FIGS. 6a and 6b illustrate the spring battery contact 85, which is identical to the contact 86. The individual fingers 85b through 85g are alternately formed in an up and down direction to provide electrical contact to both the battery terminals and the circuit traces 120 or 121. The contacts 85 and 86, as stated hereinabove, are formed from an electrically conductive material sufficiently resilient to retain their shape after compression thereof. As may be seen in the elevational view of FIG. 6b, arm 85a is formed at the end thereof in a "hook fashion" to provide an anchor for the spring contact in opening 88 or 89 of frame 68 (FIG. 3a).

Figure 7A:
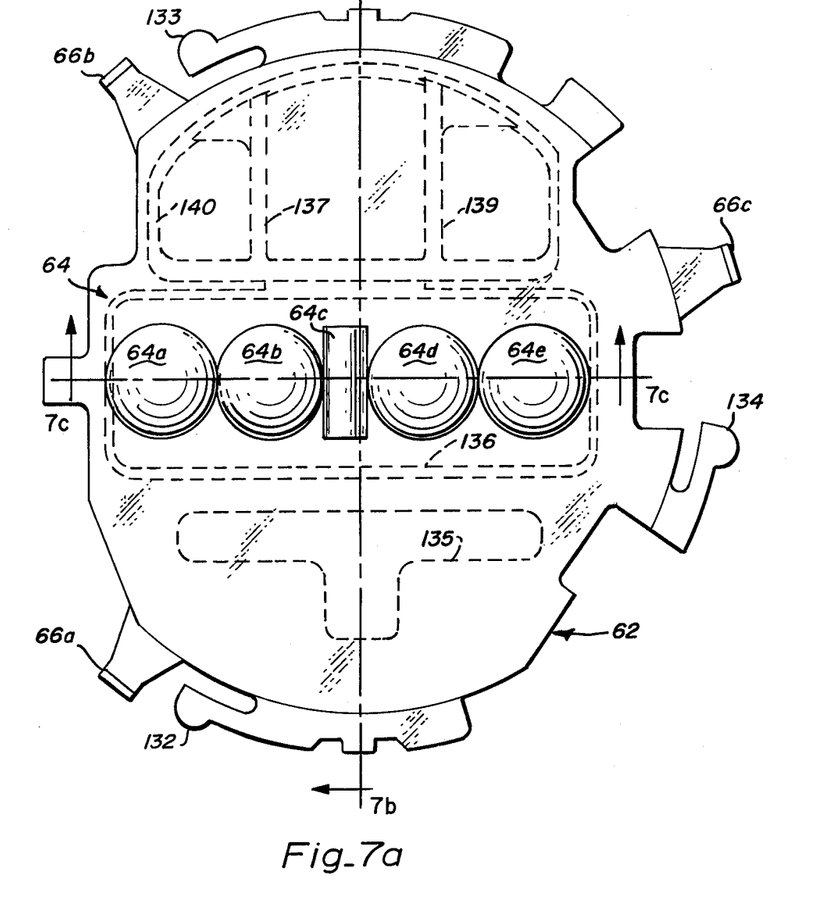
FIG. 7a is a top plan view of one embodiment of the lens plate.
Figure 7B:
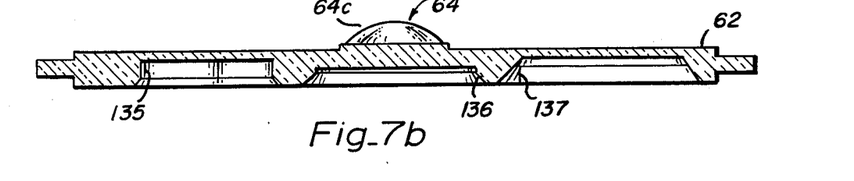
FIGS. 7b and 7c are cross-sectional views of the lens plate shown in FIG. 7a taken along lines 7b and 7c, respectively.
Figure 7C:
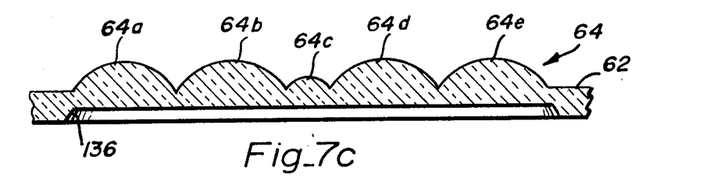

Referring now to FIGS. 7a, 7b and 7c, a plan and cross-sectional views of one embodiment of the lens plate 62 are illustrated In FIG. 7a, the tabs 66a, 66b and 66c are shown at approximately 120° apart around the periphery of the lens plate 62. In this embodiment, individual lens magnifiers 64a through 64e are incorporated in the lens plate for the respective digits and colon of the electro-optical display means 29. The use of the magnifiers allows the use of a smaller electro-optical display means, where more economical display means may be employed.

In the embodiment illustrated in FIG. 7a, three optional restraining fingers 132, 133 and 134 are provided around the periphery of the lens plate 62 adjacent each of the tabs 66a, 66b and 66c, respectively. The fingers 132, 133 and 134 engage the inside periphery of the frame 68 to laterally align the assembly 63 in the frane 68.

In FIG. 7b, recessed areas 135, 136 and 137 are better illustrated, which areas provide clearance for the capacitor C44, electro-optical display means 29, and the integrated circuit chip 32, respectively. Two additional recessed areas 139 and 140 are illustrated by dashed lines in FIG. 7a, which areas provide clearance for the segment driver 48 and the digit driver 50, respectively.

The magnifier lens 64a through 64e, and the recessed area 136 is better illustrated in FIG. 7c.

Figure 8A:
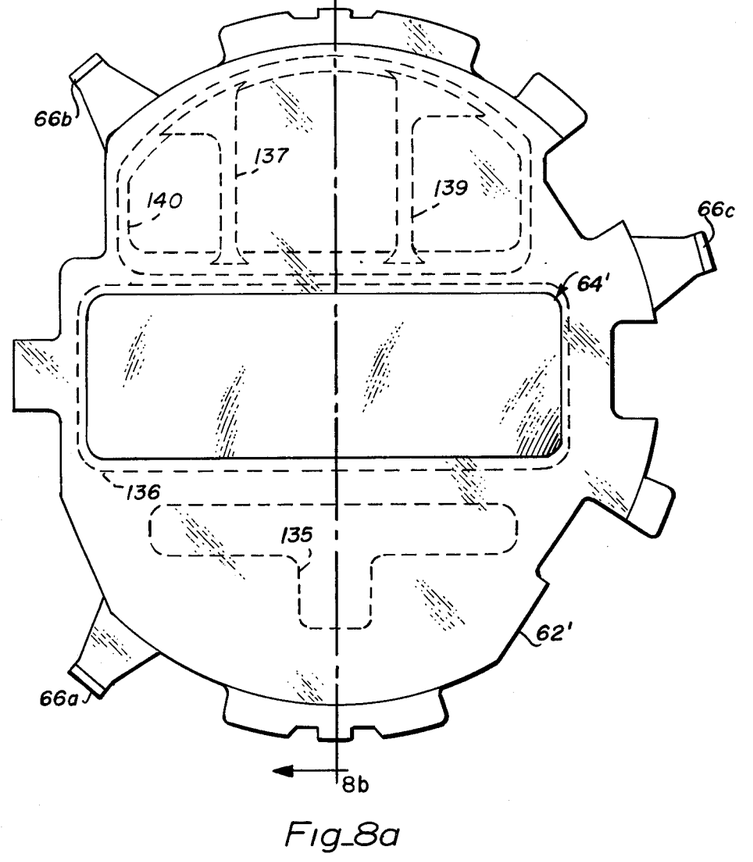
FIG. 8a is a top plan view of another embodiment of the lens plate.
Figure 8B:
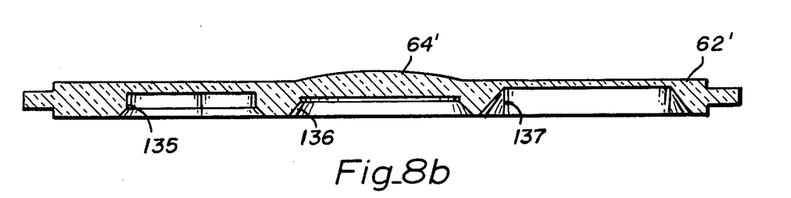
FIG. 8b is a cross-sectional view of the lens plate shown in FIG. 8a taken along the line 8b.

Referring now to FIGS. 8a and 8b a plan and cross-sectional view of another embodiment of lens plate 62' are illustrated. The lens 64' in this embodiment comprises a single lens, which is employed when a lower degree of magnification is required. Tabs 66a, 66b and 66c are the same as described above. Also, recessed areas 135 through 137 and 139 and 140 are also the same. However, in this embodiment, the restraining fingers 132 through 134 are omitted. It was discovered on subsequent tests that these fingers are not required when the tabs 66a through 66c are modified in accordance with the detail illustration thereof in FIG. 10 described further hereinbelow.

Figure 9:
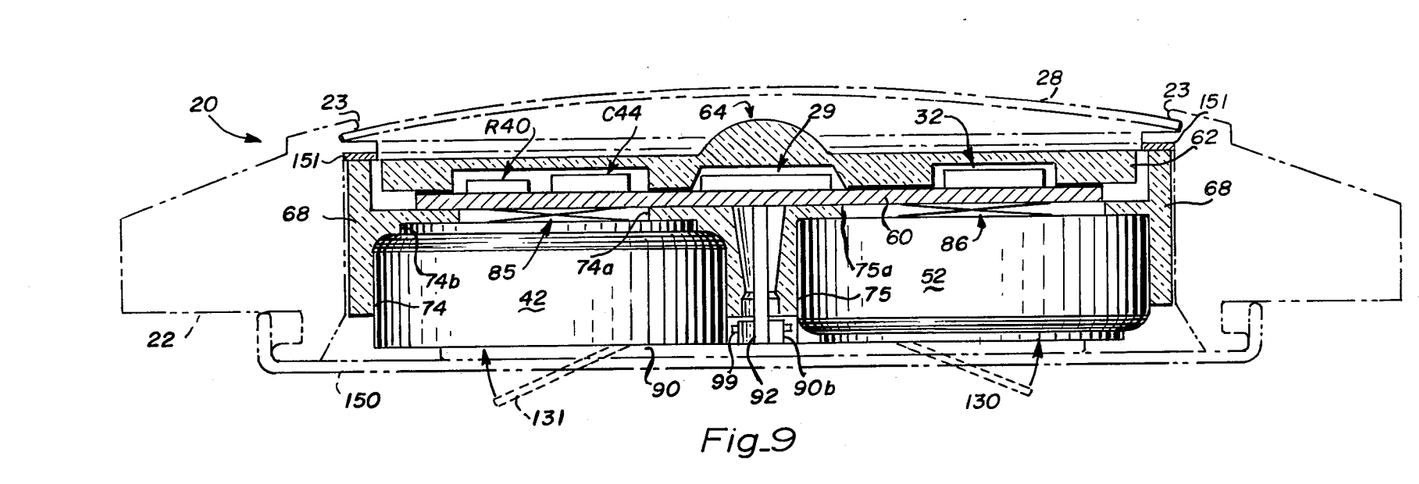
FIG. 9 is a detailed cross-sectional view of the assembled module of the present invention taken along the line 9 of FIG. 1; and, FIG. 10 is a partial cross-sectional view showning a lens plate support tab engaging a retainer therefor in the module frame.

Referring now to FIG. 9, a cross-sectional view of the assembled wristwatch 20 is illustrated. The red filter lens 28 is located in the bezel 23 of the case 22. The frame 68, including the assembly 63 (which comprises the substrate 60 with constituent components mounted thereon and the lens plate 62) are next placed in the watch case 22.

Batteries 42 and 52 are placed in the openings 74 and 75, respectively, of the frame 68, and are secured in the frame by means of the retainer 90. In particular, tab 90b of the retainer 90 engages the clip 99, which is a part of the frame 68, to secure the retainer in position. The leaf spring portions 130 and 131 of retainer 90 are illustrated by means of shadow lines in the uncompressed pressed position. Once back plate 150 is placed on the watch case 22, springs 130 and 131 are compressed toward the batteries 42 and 52.

Electrical connection of the batteries to the substrate surface 60b is provided by the spring contacts 85 and 96. and an electrical connection is made between retainer 90 and circuit trace 122 on surface 60b of substrate 60 by means of contact 92. Likewise, electrical connection of the opposite sides of the batteries is provided to the case 22 by means of the leaf springs 130 and 131 in contact with the watch backplate 150.

If the wristwatch 20 were dropped on the back side, referred to herein as a "backward shock," the batteries 42 and 52 would pull away on impact from the substrate 60. However, electrical connection is maintained between the battery terminals and substrate surface 60b by means of the spring contacts 85 and 86, and the contact 92. On the other hand, if the watch were dropped on the front side, referred to herein as a "front shock," the batteries are prevented from impacting the substrate by the flanges 74a and 75a. The force of impact of the batteries is transmitted through the frame 68 to the upper part of the case 22 at case rim 151. The electrical connection between the substrate surface 60b and the battery terminals is again maintained by the spring contacts 85 and 86, and the contact 92. The electrical connection between the opposite battery terminals and the back plate 150 is maintained by the retainer 90. The substrate and lens plate assembly 63 is restrained in forward movement by the tabs 66a, 66b and 66c (FIG. 2).

If the wristwatch 20 is dropped on an edge thereof, referred to herein as a "side shock," the tabs 66a, 66b and 66c restrain impact vibrations of the assembly 63. The electrical connections are again maintained in the same manner as described hereinabove.

Figure 10:
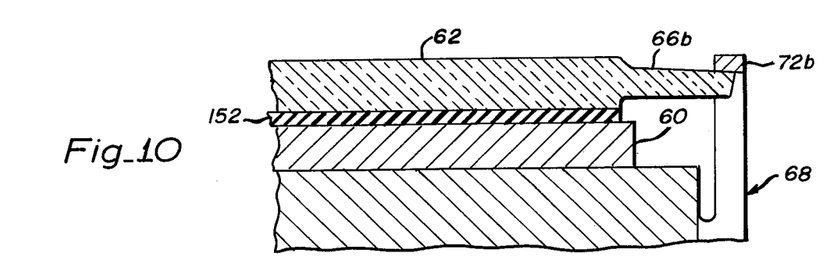

The partial cross-sectional view of FIG. 10 illustrates the engagement of the tab 66b of lens plate 62 with the retainer 72b. In this view, a detail of an epoxy bond 152 can be seen between the lens plate 62 and the substrate 60. Note also, that the substrate 60 is illustrated as being flat against the surface of frame 68, which is the normal relaxed position of these parts of the watch.

It may be appreciated from the description hereinabove that a new and improved shock resistant module for an electronic wristwatch has been described in detail. Thus, while the invention has been particularly shown and described with reference to a preferred embodiment, it will be understood by those skilled in the art that the foregoing and other changes in form and details may be made without departing from the spirit and scope of the invention. Accordingly, it is intended that the present invention only be limited by the claims set forth hereinbelow.

We claim:

1. An electronic wristwatch comprising:
    a case;
    a cup-shaped module frame of electrically insulating material having a plurality of retainers with tab receiving openings located on the periphery thereof;
    a lens plate of an electrically insulating material including a corresponding plurality of flexible tabs disposed on the periphery thereof for engaging corresponding ones of said retainers on said frame, thereby flexibly suspending said lens plate in said frame;
    a substrate mounted to said lens plate and having rigidly mounted thereto a frequency standard, a frequency divider, an electro-optical display means, and means for driving said display, said substrate including printed electrical circuit means for coupling the constituent components of the circuit forming said electronic watch;
    at least one battery mounted in an opening in said frame and having a terminal thereof electrically coupled to the printed means on said substrate; and
    means for securing said at least one battery in said frame and for coupling a second terminal of said battery to circuitry on said substrate.

2. An electronic wristwatch as in claim 1 including switch contact means disposed in said case for operating said electro-optical display means to enable display of the contents of said frequency divider.

3. An electronic wristwatch as in claim 2 further characterized by said substrate including normally open contacts in substantial alignment with said switch means, said case and said means for securing both being formed of electrically conductive material and in contact with one another, and said switch means being in contact with said case such that operation of said switch contact means couples the second terminal of said battery to said normally open contacts.

4. An electronic wristwatch as in claim 3 further characterized by said normally open contacts being independent from the suspension of said lens plate in said frame.

5. An electronic wristwatch as in claim 1 further characterized by said frame including a pair of tab receiving means on the bottom side thereof, and said means for securing including a pair of tabs formed thereon such that said means for securing is urged against the bottom side of said frame to secure the battery in said frame.

6. An electronic wristwatch as in claim 5 including at least two batteries both secured in said frame by said means for securing and including an electrical contact means located in an opening in said frame such that an electrical connection is formed between said means for securing and the circuit traces on said substrate.

7. An electronic wristwatch as in claim 5 wherein said means for securing comprises a resilient electrically conductive material.

8. For use in an electronic wristwatch having a case and a watch module therein, said module including a frequency source, frequency divider and logic means, display means, driver means for said display means, and battery means; a shock-resistant support for retaining said watch module within said case comprising:
    a cup-shaped frame of electrically insulating material having a peripheral lip and a plurality of retainer clips with tab receiving openings located in the peripheral lip of said frame, and having at least one opening therein for receiving a battery; and
    a lens plate assembly including a lens plate and a substrate supporting the electronic components of the wristwatch, said lens plate having a plurality of flexible tabs disposed on the periphery thereof for engaging corresponding ones of said retainer clips in said frame such that said lens plate assembly is flexibly suspended in said cup-shaped frame.

9. A shock-resistant support as defined by claim 8 wherein said cup-shaped frame receives battery means from one side of said case and receives said lens plate for display through the other side of said case.

* * * * *